Oct. 5, 1971  E. WALDMANN  3,609,967
GAS-TURBINE DRIVE UNIT HAVING AN EXPANSION
TURBINE WITH ADJUSTABLE GUIDE BLADING
Filed Aug. 7, 1969

INVENTOR
EMIL WALDMANN

BY
Craig, Antonelli, Stewart & Hill
ATTORNEYS

United States Patent Office 3,609,967
Patented Oct. 5, 1971

3,609,967
GAS-TURBINE DRIVE UNIT HAVING AN EXPANSION TURBINE WITH ADJUSTABLE GUIDE BLADING
Emil Waldmann, Stuttgart-Wangen, Germany, assignor to Daimler-Benz Aktiengesellschaft
Filed Aug. 7, 1969, Ser. No. 848,190
Claims priority, application Germany, Aug. 7, 1968, P 17 51 845.5
Int. Cl. F02c 1/06, 9/08, 7/02
U.S. Cl. 60—39.18 C
4 Claims

ABSTRACT OF THE DISCLOSURE

A gas turbine drive unit for vehicles in which an expansion turbine with an adjustable guide blading is connected to the input of the compressor to permit practically instantaneous power output increases of the drive unit by adjustment of the guide blading.

The present invention relates to a gas-turbine drive unit for vehicles with a compressor and with a gas turbine connected with the compressor by way of a combustion chamber and driving the compressor or with a gas turbine group having an output turbine and a compressor turbine driving the compressor.

An essential inadequacy of the presently known gas turbine drive units for vehicles consists in the time requirement, frequently excessive for the practical demands, for achieving an increased power output of the drive unit compared to the pre-existing power output. For the purpose of achieving in the known drive units the increased power output, at first a corresponding increase of the rotational speed of the gas generator up to the higher output condition is necessary, which is possible only relatively slowly in view of the rotating masses to be accelerated. For the suitability of a gas turbine drive unit, however, not only the power reserve, available in principle, is decisive but the requirement that the necessary output is also available instantaneously in every traffic situation under the present dense traffic and existing road conditions. Particularly in this regard the known gas-turbine drive units for vehicles, however, still exhibit the aforementioned inadequacy of an excessively slow acceleration possibility.

The present invention aims at so perfecting the gas turbine drive units in question herein that at least a considerably more rapid increase of the delivered power output of the drive unit from the partial load range is made possible.

The underlying problems are solved in accordance with the present invention in that an expansion turbine variable in its head or drop is connected in front or in the input of the compressor of the gas-turbine drive unit.

Such an expansion turbine with a variable head makes it possible to operate the drive unit in the partial load range with a more or less fully engaged or expansion turbine whereby the air flows to the compressor of the drive unit with a correspondingly reduced density and therewith the rate of flow and output of the drive unit is correspondingly throttled. For the purpose of increasing the produced output of the drive unit, for example, by about 40 percent, initially only the expansion drop or head of the expansion turbine then has to be reduced whereupon the rate of flow and the output of the drive unit increases practically without delay corresponding to the increasing density of the inflowing air and of the increase of the pressure level of the cycle without the necessity of a rotational speed increase.

Whereas the input or drive power for the compressor with a relieved expansion turbine is supplied in the usual manner exclusively by the compressor turbine, with a loaded expansion turbine also the latter may be utilized for the production of this drive power. The expansion turbine may also be utilized for the change of the brake power of the compressor. Furthermore, the drive unit in accordance with the present invention enables to maintain the maximum temperature in front or at the input of the compressor turbine with maximum rotational speed up to a partial load, for example, $0.6 \cdot N_{max}$. The rotational speed control has to become effective only at this partial load whereby it is possible to drive in the lower output range with a relatively higher rotational speed and correspondingly with more favorable efficiency.

According to a preferred construction of the present invention, the expansion turbine is provided on the inlet side with an adjustable guide baffle or guide blading, by means of which the change of the head or drop of the turbine can be realized in a particularly favorable and constructively simple manner.

According to another feature of the present invention, the expansion turbine is adapted to be loaded negatively which makes it possible, especially with a simple, for example, rigid coupling of this turbine to the compressor, to brake the compressor rotor by a negative loading of the expansion turbine.

According to a further feature of the present invention, the rotors of the expansion turbine and of the compressor of the drive unit are coupled with each other by way of an over-running clutch which is arranged preferably in the sense of enabling a faster rotation of the compressor compared to the rotational speed of the expansion turbine, i.e., an overtaking of the compressor in relation to the expansion turbine. With a complete relieve or unloading of the expansion turbine, the latter can then rotate independently of the rotation speed of the compressor with the rotational speed matched most favorably to the flow conditions.

According to a further preferred construction of the present invention, the expansion turbine and the forward or upstream compressor section is adapted to be heated whereby a possible icing of structural parts of the drive unit by the air that is cooled off by the expansion is prevented.

According to a still further feature of the present invention, the rotor and stator parts of the expansion turbine and of the first compressor stage are adapted to be heated by the exhaust gases of the gas turbine. The stator parts and housing walls of the expansion turbine according to another construction of the present invention may, however, also be adapted to be heated by the lubricating oil of the drive unit, in which case the parts adapted to be heated of the expansion turbine constitute at the same time an oil cooler.

Accordingly, it is an object of the present invention to provide a gas-turbine drive unit for vehicles, especially motor vehicles, which avoids the aforementioned shortcomings and drawbacks encountered in the prior art by simple means.

Another object of the present invention resides in a gas turbine drive unit for vehicles which permits an almost instantaneous increase in power output without the need of increasing the rotational speed of the gas generator to a speed corresponding to the increased power output.

A further object of the present invention resides in a gas turbine drive unit for vehicles which is capable of meeting the requirements made of such drive unit in present day motor vehicle traffic conditions.

Still a further object of the present invention resides in a gas turbine drive unit for motor vehicles which is capable of increases in the output thereof without any significant delays.

Still another object of the present invention resides in a gas turbine drive unit which permits operation in the lower power output range with relatively higher rotational speed and thus with corresponding more favorable efficiency.

A further object of the present invention resides in a gas turbine drive unit of the type described above which not only fulfills all of the aforementioned aims and objects by structurally simple and inexpensive means but additionally results in a compact construction, minimizing the parts necessary for proper operation thereof.

These and further objects, features and advantages of the present invention will become more obvious from the following description when taken in connection with the accompanying drawing which shows, for purposes of illustration only, one embodiment in accordance with the present invention, and wherein.

Figure 1:
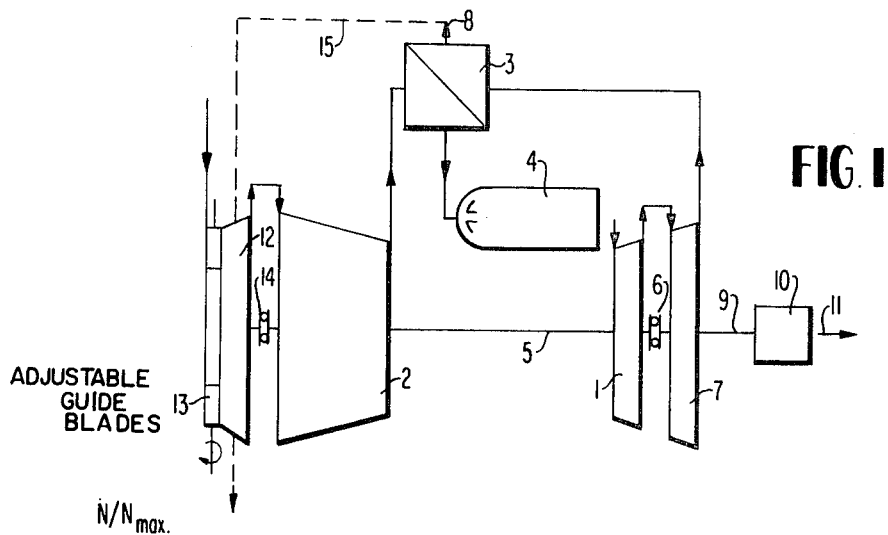
FIG. 1 is a schematic view of a gas turbine drive unit in accordance with the present invention.

Referring now to the drawing, and more particularly to FIG. 1, the gas turbine drive unit for vehicles illustrated in this figure consists in a usual manner of a compressor 2 adapted to be driven from a compressor-turbine 1, whereby the compressed air of the compressor 2 is supplied to the compressor-turbine 1 by way of a heat-exchanger 3 heated by the exhaust gases (in a manner to be described more fully hereinafter) and by way of a combustion chamber 4. In the combustion chamber 4, the air passing therethrough is heated corresponding to the desired power output in a conventional manner (not shown) by injected and combusted fuel up to a maximum possible air utilization that is still permissive as regards temperature for the compressor turbine. The rotors (not shown) of the compressor turbine 1 and of the compressor 2 are both arranged on a shaft 5 to rotate in unison.

An output or work turbine 7 axially adjoins the compressor turbine 1 of the so far described, conventional generator part of the gas turbine drive unit by way of an overrunning clutch 6 in such a manner that the output turbine 7 is unable to overtake the compressor turbine 1 whereas the compressor turbine 1 is able to overtake the output turbine 7 by means of the free-wheeling clutch 6. As to the rest, the output turbine 7 forms the second stage of a gas turbine group including as first stage the compressor turbine 1. The exhaust gases of the gas turbine group, which flow off from the output turbine 7, are supplied or conducted to the heat-exchanger 3 and prior to their escape into the free atmosphere in the direction of arrow 8, are utilized for the purpose of heating the compressed air supplied to the combustion chamber 4. The output shaft 9 connected with the rotor (not shown) of the output turbine 7 leads to a conventional speed-reduction change-speed transmission 10 whose output shaft 11 drives the driving wheels of a vehicle (not shown) provided with the drive unit.

As can be further seen from FIG. 1, an expansion turbine 12 is operatively connected to the input of the compressor 2 whose drop or head can be adjusted by an adjustable guide baffle or blading means 13 of conventional construction and arranged on the inlet side thereof. The rotors (not shown) of the expansion turbine 12 and of the compressor 2 are connected with each other by an over-running clutch 14 which permits a faster rotation of the compressor 2 as compared to the rotational speed of the expansion turbine 12. As a result thereof, the expansion turbine 12 may in case of its complete unloading, adapt itself with its rotational speed to the most favorable flow conditions.

According to the illustrated embodiment, the rotor and stator parts (not shown) of the expansion turbine 12 and of the first stage of the compressor 2 are adapted to be heated within the entire undercooled area by the exhaust gases flowing out of the heat-exchanger 3 and conducted by way of the line 15 indicated in dash line. Since this heating takes place in principle in the same manner as the usual cooling of hot-loaded gas turbines, a detailed description and showing of the heating installation for the expansion turbine 12 is dispensed with herein.

The described gas turbine drive unit differs according to the preceding description from the known gas turbine drive units by the input connection of the expansion turbine 12 variable in its drop and adapted to be heated. During the operation of the drive unit with a completely unloaded or disengaged expansion turbine, realized by means of the adjustable guide blading 13, one obtains an the output curve of a drive unit constructed without ex-shown in FIG. 2 which differs only very slightly from the output curve of a drive unit construced without expansion turbine because certain flow losses occur upstream of the compressor also with disengaged or turned off expansion turbine during the passage therethrough of the air.

Figure 2:
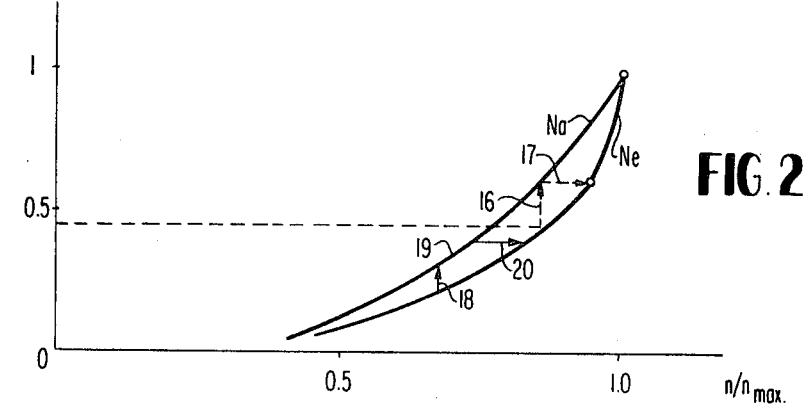
FIG. 2 is a diagram of the power output of the drive unit according to FIG. 1.

If the expansion turbine 2 is engaged fully by means of the adjustable guide blading, then an output curve Ne results according to FIG. 2 which corresponding to the rate of air flow reduced by the expansion of the air supplied to the compressor 2 extends below the output curve Na and has its maximum value at a rotational speed of the drive unit amounting to about 95% of the maximum rotational speed.

If the drive unit, for example, in a partial load range with a fully engaged expansion turbine 12, is operated with a power otput of 45 percent of the maximum drive unit power output and is to be brought—for example, when driving up an incline—to a larger power output as delay-free as possible, then at first only the expansion turbine 12 has to be rendered ineffective, which can take place very rapidly by a corresponding adjustment of the adjustable guide baffles or blades 13. As a result thereof, the rate of air flow of the compressor 2 is increased correspondingly rapidly so that a correspondingly increased gas quantity heated by means of a corresponding fuel increase in the combustion chamber 4 is also supplied to the compressor turbine 1. According to FIG. 2, this has as a consequence that the output with a constant speed of the drive unit can be increased, for example, by 40 percent along the narrow 16 of FIG. 2 practically without delay.

If the power output increase achieved exclusively by the disengagement of the expansion turbine 12 should sufficie to cover the necessary increased power output, then one will use the expansion turbine to create a power reserve for a possible subsequent rapid power increase. Consequently, one will cause according to the diagram of FIG. 2 the expansion drop of the expansion turbine to increase again by corresponding adjustment of the adjustable guide blading 13 with simultaneous rotational speed increase whereby in the diagram according to FIG. 2, the power output curve Na is again left at the tip of the arrow 16 and again returns along the horizontal arrow 17 to the power output curve Ne, in which the expansion turbine 12 is again fully engaged or rendered effective. Thereafter, a new power output increase is possible in the same manner as already described hereinabove.

A corresponding output increase is, of course, also possible in the lower partial load range whereby then the smaller absolute value of the rapidly achieved output increase can be further increased, for example, by a subsequent rotational speed increase taking place with a completely disengaged expansion turbine 12 until at the desired output level, the expansion turbine 12 is engaged or rendered operable. Such an output increase is indicated in FIG. 2 by arrows, 18, 19 and 20.

During the rapid opening of the adjustable guide baffles or blades 13 in the sense of a disengagement of the expansion turbine 12, the flow conditions at the inlet to the combustion chamber 4 change so little that with properly dimensioned fuel addition, no interruption of the combustion needs to be feared. In contradistinction thereto, it is quite unusual with the described output increase that at first the proportion in drive power supplied by the previously engaged expansion turbine 12 is at first withdrawn from the generator part of the drive unit before the drive power of the compressor 2 can be increased by the increase of the rate of flow and of the inlet temperature at the compressor turbine 1. The increased power input absorbed by the compressor 2 for the suddenly increased rate of air flow is therefore not covered for a short moment by the compressor turbine. However, a corresponding examination of the inertia forces available from the rotating masses indicates that the moment of inertia of the rotating masses is quite adequate to bridge the only very short time gap, after which a considerably increased drive power is available. Even if the adjustment of the adjustable guide blading 13 takes place very rapidly, for example, within a time period of $\frac{1}{10}$ of a second, the described instantaneous power storage cannot prevent the described rapid acceleration.

Figure 3:
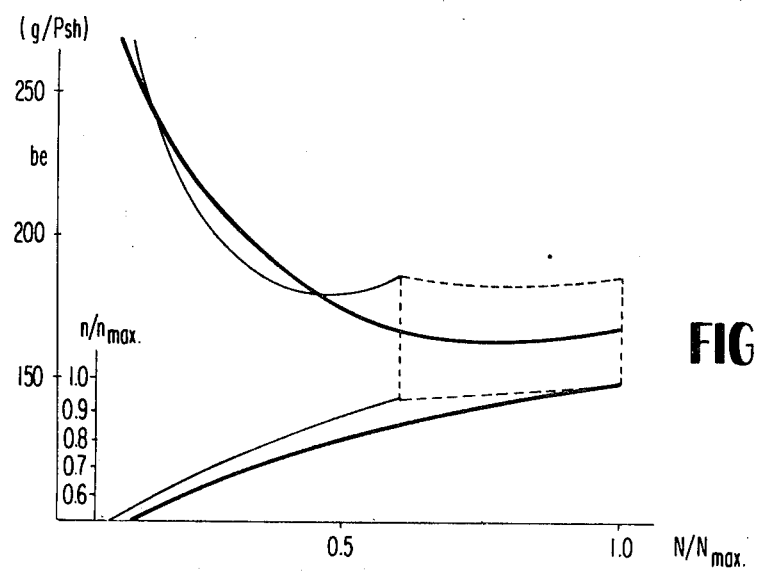
FIG. 3 is a diagram of the fuel consumption of the drive unit of FIG. 1.

FIG. 3 illustrates in the heavy full-line curves the specific fuel consumption and the rotational speed of the drive unit constructed without expansion turbine plotted against the power output. The thin full-line curves show the corresponding values of the drive unit with an expansion turbine 12 connected to the input of the compressor and completely engaged. It can be seen from FIG. 3 that with the expansion ratio of expansion turbine on which the illustrated embodiment is based, the specific fuel consumption in the lower, partial load range with engaged expansion turbine lies even somewhat below the consumption of the drive unit without expansion turbine. Since gas turbine drive units for vehicles are for the most part operated predominantly in the lower partial load range, this advantage, achieved in addition to the aimed-at rapid power increase, equalizes far-reachingly the naturally unavoidable higher specific fuel consumption, also visible from FIG. 3, with an expansion turbine engaged in the higher power output ranges. It is also to be noted as to the rest that the diagrams illustrated in FIGS. 2 and 3 correspond to a certain design of the drive unit and especially to a certain expansion ratio of the expansion turbine 12. If the expansion ratio of the expansion turbine 12 is, for example, still further increased, then also a correspondingly increased power output increase can be achieved with constant rotational speed unit. Of course, a corresponding decreased maximum power with completely engaged expansion turbine 12 and a corresponding increased specific fuel consumption in the last-mentioned operation condition are in opposition to these improvements. In FIG. 3, the last-mentioned condition with the design of the drive unit according to the embodiment is illustrated by the respective right end of the two curves shown in thin full lines. A higher output of the drive unit compared to this operating condition then makes necessary a corresponding disengagement of the expansion turbine 12, as indicated by the adjoining curves, shown in dash lines. The drive unit is always operated in the partial-load range with a completely engaged expansion turbine 12. The expansion turbine 12 is temporarily disconnected only for the purpose of an output increase and acceleration or is finally increasingly completely disconnected or rendered ineffective for the achievement of a higher power output.

If the vehicle is, for example, during a downhill drive, in a braked steady state condition which results from the equilibrium of the brake output of the drive unit and of the thrust output of the vehicle, then the condition may occur that—for example, with a decrease of the incline—the braking has to be reduced. With vehicles having a gas turbine drive unit customary heretofore, either the transmission ratio or speed has to be changed or fuel has to be added again. With the presence of the described expansion turbine, there still exists, in contradistinction thereto, the possibility to reduce the rate of flow through the drive unit by a loading of the previously more or less unloaded expansion turbine and to cover thereby a certain velocity range. Conversely, the drive unit can also be further decelerated when removing the gas in that the expansion turbine is momentarily unloaded. Thereafter, the compressor and the compressor turbine are able to absorb a correspondingly higher brake power by reason of the suddenly increased weight of the rate of flow.

The principle according to the present invention of the input connection of an expansion turbine is suitable, beyond the illustrated and described embodiment, also for any type of gas turbines, even for a differential turbine. The compressor of the generator part may, for example, also be constructed as multi-stage axial compressor. The heating of the expansion turbine may take place, in lieu of by the exhaust gases of the work turbine, also by the lubricating oil of the drive unit in which case the heated parts of the expansion turbine serve simultaneously as oil cooler.

Thus, while I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. A gas turbine drive unit for vehicles with a compressor means and with a gas turbine means drivingly connected with the compressor means, combustion chamber means operatively connecting the gas turbine means with the compressor means, expansion turbine means having a variable pressure drop being operatively connected in series flow to the input of the compressor means, means for heating the expansion turbine and the forward section of the compressor means, with the rotor and stator parts of the expansion turbine means and of the first compressor stage heated by the exhaust gases of the gas turbine means, and the rotors of the expansion turbine means and of the compressor means being connected with each other by over-running clutch means to enable a more rapid rotation of the compressor means compared to the rotational speed of the expansion turbine means.

2. A gas turbine drive unit according to claim 1, characterized in that the gas turbine means includes an output turbine means and a compressor drive turbine means driving the compressor means.

3. A drive unit according to claim 1, characterized in that the expansion turbine means includes an adjustable guide blading means on the inlet side thereof, wherein the expansion turbine means is adapted to be loaded negatively.

4. A gas turbine drive unit according to claim 3, characterized in that the gas turbine means includes an output turbine means and a compressor drive turbine means driving the compressor means.

References Cited

UNITED STATES PATENTS

| | | | |
|---|---|---|---|
| 2,474,258 | 6/1949 | Kroon | 60—39.09 DI X |
| 2,482,791 | 9/1949 | Nehel et al. | 60—39.16 X |
| 2,591,540 | 4/1952 | Grylls | 60—39.16 X |
| 2,634,049 | 4/1953 | Hodges et al. | 60—39.09 DI |
| 2,802,334 | 8/1957 | Fletcher et al. | 60—39.16 |
| 3,498,057 | 3/1970 | Kronogard et al. | 60—39.16 |
| 2,544,941 | 3/1951 | Strub | 60—39.18 |

MARK M. NEWMAN, Primary Examiner

U.S. Cl. X.R.

60—39.16 R, 39.51 R